(12) United States Patent
Zhou et al.

(10) Patent No.: US 9,519,542 B2
(45) Date of Patent: Dec. 13, 2016

(54) STORAGE CONTROL DEVICE AND STORAGE CONTROL METHOD

(71) Applicant: FUJITSU LIMITED, Kawasaki-shi, Kanagawa (JP)

(72) Inventors: Guangyu Zhou, Kawasaki (JP); Takeshi Watanabe, Kawasaki (JP); Kazuhiko Ikeuchi, Kawasaki (JP); Chikashi Maeda, Kawasaki (JP); Yukari Tsuchiyama, Kawasaki (JP); Kazuhiro Urata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 5 days.

(21) Appl. No.: 14/793,002

(22) Filed: Jul. 7, 2015

(65) Prior Publication Data
US 2016/0041877 A1    Feb. 11, 2016

(30) Foreign Application Priority Data

Aug. 8, 2014  (JP) ................. 2014-162259

(51) Int. Cl.
G06F 11/00   (2006.01)
G06F 11/10   (2006.01)
G06F 11/20   (2006.01)

(52) U.S. Cl.
CPC ....... G06F 11/1092 (2013.01); G06F 11/2094 (2013.01)

(58) Field of Classification Search
USPC .................................. 714/6.2, 6.22
See application file for complete search history.

(56) References Cited

U.S. PATENT DOCUMENTS

| 7,404,104 B2* | 7/2008 | Elliott | G06F 11/1662 |
| | | | 711/1 |
| 2005/0015653 A1* | 1/2005 | Hajji | G06F 11/1092 |
| | | | 714/6.2 |
| 2013/0346794 A1* | 12/2013 | Bartlett | G06F 11/2094 |
| | | | 714/6.21 |
| 2015/0269025 A1* | 9/2015 | Krishnamurthy | G06F 11/1092 |
| | | | 714/6.24 |

FOREIGN PATENT DOCUMENTS

| JP | 6-230903 | 8/1994 |
| JP | 2005-38271 | 2/2005 |
| JP | 2006-260446 | 9/2006 |

* cited by examiner

*Primary Examiner* — Sarai Butler
(74) *Attorney, Agent, or Firm* — Staas & Halsey LLP

(57) ABSTRACT

A storage control apparatus includes a controller to, when more storage devices, among a plurality of storage devices across which a plurality of information areas storing information representing redundant data and one or more spare areas are distributed, than the number of the spare areas fail, perform a rebuild process of information stored in a plurality of information areas of a failed first storage device included in the plurality of combinations of the plurality of information areas and the one or more spare areas, the rebuild process including restoring information corresponding to one information area of the failed first storage device included in one combination among the plurality of combinations, and determining a write destination storage device to which the restored information is to be written in accordance with the number of times information is read from a non-failed second storage device.

8 Claims, 26 Drawing Sheets

FIG. 1A
FIG. 1B
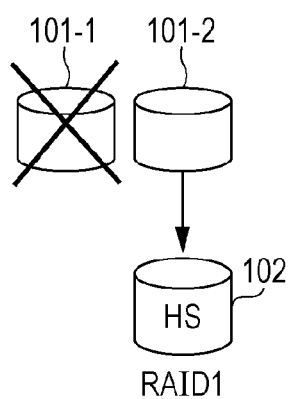
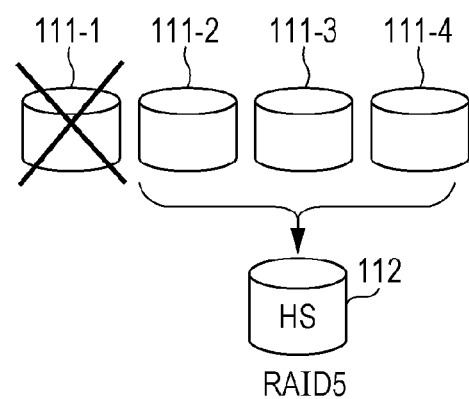

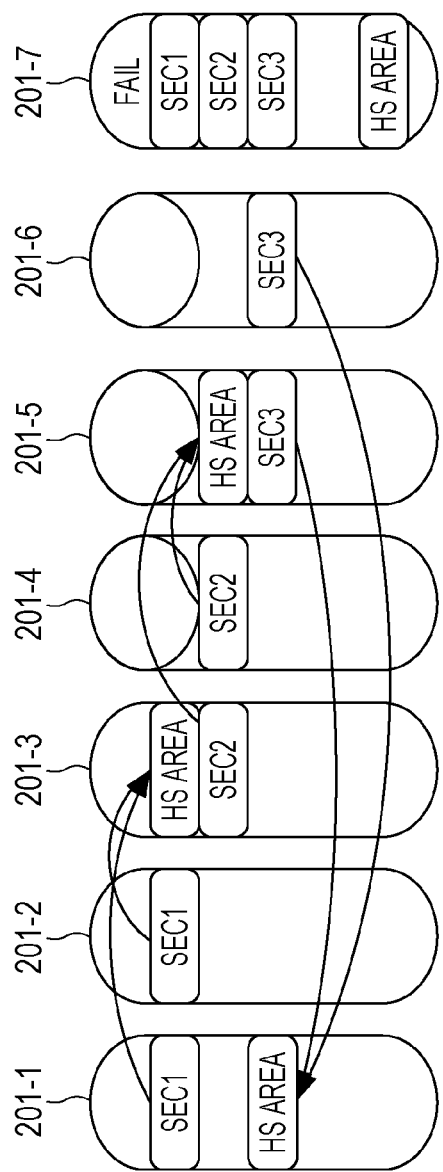

FIG. 3

| | Disk #0 | Disk #1 | Disk #2 | Disk #3 | Disk #4 | Disk #5 | Disk #6 |
|---|---|---|---|---|---|---|---|
| stripe #0 | 0 | 1 | P0 | 2 | 3 | P1 | HS0 |
| stripe #1 | 4 | 5 | P2 | 6 | 7 | P3 | HS1 |
| stripe #2 | 8 | 9 | P4 | 10 | 11 | P5 | HS2 |
| stripe #3 | 12 | 13 | P6 | 14 | 15 | P7 | HS3 |
| stripe #4 | 16 | 17 | P7 | 18 | 19 | P9 | HS4 |
| ⋮ | ⋮ | ⋮ | ⋮ | ⋮ | ⋮ | ⋮ | |
| stripe #41 | 164 | 165 | P82 | 166 | 167 | P83 | HS41 |

FIG. 4

| | Disk #0 | Disk #1 | Disk #2 | Disk #3 | Disk #4 | Disk #5 | Disk #6 |
|---|---|---|---|---|---|---|---|
| stripe #0 | 0 | HS0 | P1 | 3 | 2 | P0 | 1 |
| stripe #1 | 5 | 4 | HS1 | P3 | 7 | 6 | P2 |
| stripe #2 | P4 | 9 | 8 | HS2 | P5 | 11 | 10 |
| stripe #3 | 14 | P6 | 13 | 12 | HS3 | P7 | 15 |
| stripe #4 | 19 | 18 | P8 | 17 | 16 | HS4 | P9 |
| ... | ... | ... | ... | ... | ... | ... | ... |
| stripe #41 | 165 | P82 | 166 | 167 | P83 | HS41 | 164 |

FIG. 5

| | Disk #0 | Disk #1 | Disk #2 | Disk #3 | Disk #4 | Disk #5 | Disk #6 |
|---|---|---|---|---|---|---|---|
| stripe #0 | Disk #0 | Disk #6 | Disk #5 | Disk #4 | Disk #3 | Disk #2 | Disk #1 |
| stripe #1 | Disk #1 | Disk #0 | Disk #6 | Disk #5 | Disk #4 | Disk #3 | Disk #2 |
| stripe #2 | Disk #2 | Disk #1 | Disk #0 | Disk #6 | Disk #5 | Disk #4 | Disk #3 |
| stripe #3 | Disk #3 | Disk #2 | Disk #1 | Disk #0 | Disk #6 | Disk #5 | Disk #4 |
| stripe #4 | Disk #4 | Disk #3 | Disk #2 | Disk #1 | Disk #0 | Disk #6 | Disk #5 |
| ... | ... | ... | ... | ... | ... | ... | ... |
| stripe #41 | ... | ... | ... | ... | ... | ... | ... |

FIG. 6A

|  | Disk #0 | Disk #1 | Disk #2 | Disk #3 | Disk #4 | Disk #5 | Disk #6 | TO BE RESTORED |
|---|---|---|---|---|---|---|---|---|
| stripe #0 | 0 | 6 | 5 | 4 | 3 | 2 | 1 | 0 |
| stripe #1 | 1 | 0 | 6 | 5 | 4 | 3 | 2 | 1 |
| stripe #2 | 2 | 1 | 0 | 6 | 5 | 4 | 3 | 2 |
| stripe #3 | 3 | 2 | 1 | 0 | 6 | 5 | 4 | 3 |
| stripe #4 | 4 | 3 | 2 | 1 | 0 | 6 | 5 | 4 |
| stripe #5 | 5 | 4 | 3 | 2 | 1 | 0 | 6 | 5 |
| stripe #6 | 6 | 5 | 4 | 3 | 2 | 1 | 0 | NONE |
| stripe #7 | 0 | 3 | 6 | 2 | 5 | 1 | 4 | 0 |
| stripe #8 | 4 | 0 | 3 | 6 | 2 | 5 | 1 | 4 |
| stripe #9 | 1 | 4 | 0 | 3 | 6 | 2 | 5 | 1 |
| stripe #10 | 5 | 1 | 4 | 0 | 3 | 6 | 2 | 5 |
| stripe #11 | 2 | 5 | 1 | 4 | 0 | 3 | 6 | 2 |
| stripe #12 | 6 | 2 | 5 | 1 | 4 | 0 | 3 | NONE |
| stripe #13 | 3 | 6 | 2 | 5 | 1 | 4 | 0 | 3 |
| stripe #14 | 0 | 2 | 4 | 6 | 1 | 3 | 5 | 0 |
| stripe #15 | 5 | 0 | 2 | 4 | 6 | 1 | 3 | 5 |
| stripe #16 | 3 | 5 | 0 | 2 | 4 | 6 | 1 | 3 |
| stripe #17 | 1 | 3 | 5 | 0 | 2 | 4 | 6 | 1 |
| stripe #18 | 6 | 1 | 3 | 5 | 0 | 2 | 4 | NONE |
| stripe #19 | 4 | 6 | 1 | 3 | 5 | 0 | 2 | 4 |
| stripe #20 | 2 | 4 | 6 | 1 | 3 | 5 | 0 | 2 |

FIG. 6B

|  | Disk #0 | Disk #1 | Disk #2 | Disk #3 | Disk #4 | Disk #5 | Disk #6 | TO BE RESTORED |
|---|---|---|---|---|---|---|---|---|
| stripe #21 | 0 | 5 | 3 | 1 | 6 | 4 | 2 | 0 |
| stripe #22 | 2 | 0 | 5 | 3 | 1 | 6 | 4 | 2 |
| stripe #23 | 4 | 2 | 0 | 5 | 3 | 1 | 6 | 4 |
| stripe #24 | 6 | 4 | 2 | 0 | 5 | 3 | 1 | NONE |
| stripe #25 | 1 | 6 | 4 | 2 | 0 | 5 | 3 | 1 |
| stripe #26 | 3 | 1 | 6 | 4 | 2 | 0 | 5 | 3 |
| stripe #27 | 5 | 3 | 1 | 6 | 4 | 2 | 0 | 5 |
| stripe #28 | 0 | 4 | 1 | 5 | 2 | 6 | 3 | 0 |
| stripe #29 | 3 | 0 | 4 | 1 | 5 | 2 | 6 | 3 |
| stripe #30 | 6 | 3 | 0 | 4 | 1 | 5 | 2 | NONE |
| stripe #31 | 2 | 6 | 3 | 0 | 4 | 1 | 5 | 2 |
| stripe #32 | 5 | 2 | 6 | 3 | 0 | 4 | 1 | 5 |
| stripe #33 | 1 | 5 | 2 | 6 | 3 | 0 | 4 | 1 |
| stripe #34 | 4 | 1 | 5 | 2 | 6 | 3 | 0 | 4 |
| stripe #35 | 0 | 1 | 2 | 3 | 4 | 5 | 6 | 0 |
| stripe #36 | 6 | 0 | 1 | 2 | 3 | 4 | 5 | NONE |
| stripe #37 | 5 | 6 | 0 | 1 | 2 | 3 | 4 | 5 |
| stripe #38 | 4 | 5 | 6 | 0 | 1 | 2 | 3 | 4 |
| stripe #39 | 3 | 4 | 5 | 6 | 0 | 1 | 2 | 3 |
| stripe #40 | 2 | 3 | 4 | 5 | 6 | 0 | 1 | 2 |
| stripe #41 | 1 | 2 | 3 | 4 | 5 | 6 | 0 | 1 |

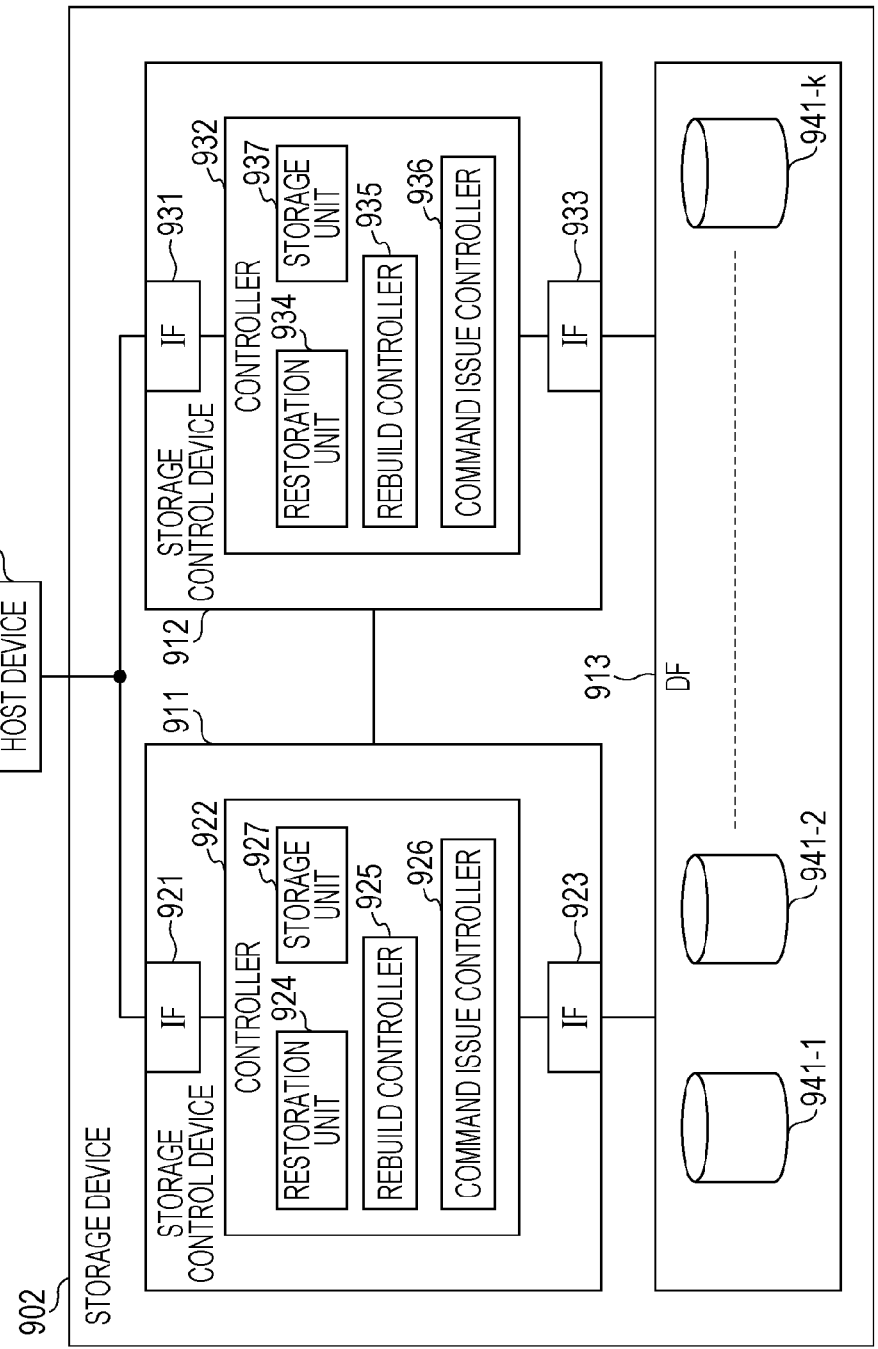

FIG. 10A

| | Disk #0 | Disk #1 | Disk #2 | Disk #3 | Disk #4 | Disk #5 | Disk #6 | TO BE RESTORED |
|---|---|---|---|---|---|---|---|---|
| stripe #0 | 0 | 0 | 5 | 4 | 3 | 2 | 1 | 0 |
| stripe #1 | 1 | 0 | 1 | 5 | 4 | 3 | 2 | 0 |
| stripe #2 | 2 | 1 | 0 | 2 | 5 | 4 | 3 | 1 |
| stripe #3 | 3 | 2 | 1 | 0 | 3 | 5 | 4 | 2 |
| stripe #4 | 4 | 3 | 2 | 1 | 0 | 4 | 5 | 3 |
| stripe #5 | 5 | 4 | 3 | 2 | 1 | 0 | 5 | 4 |
| stripe #6 | 6 | 5 | 4 | 3 | 2 | 1 | 0 | 5 |
| stripe #7 | 0 | 3 | 0 | 2 | 5 | 1 | 4 | 3 |
| stripe #8 | 4 | 0 | 3 | 4 | 2 | 5 | 1 | 0 |
| stripe #9 | 1 | 4 | 0 | 3 | 1 | 2 | 5 | 4 |
| stripe #10 | 5 | 1 | 4 | 0 | 3 | 5 | 2 | 1 |
| stripe #11 | 2 | 5 | 1 | 4 | 0 | 3 | 2 | 5 |
| stripe #12 | 6 | 2 | 5 | 1 | 4 | 0 | 3 | 2 |
| stripe #13 | 3 | 3 | 2 | 5 | 1 | 4 | 0 | 3 |
| stripe #14 | 0 | 2 | 4 | 0 | 1 | 3 | 5 | 2 |
| stripe #15 | 5 | 0 | 2 | 4 | 5 | 1 | 3 | 0 |
| stripe #16 | 3 | 5 | 0 | 2 | 4 | 3 | 1 | 5 |
| stripe #17 | 1 | 3 | 5 | 0 | 2 | 4 | 1 | 3 |
| stripe #18 | 6 | 1 | 3 | 5 | 0 | 2 | 4 | 1 |
| stripe #19 | 4 | 4 | 1 | 3 | 5 | 0 | 2 | 4 |
| stripe #20 | 2 | 4 | 2 | 1 | 3 | 5 | 0 | 4 |

FIG. 10B

|  | Disk #0 | Disk #1 | Disk #2 | Disk #3 | Disk #4 | Disk #5 | Disk #6 | TO BE RESTORED |
|---|---|---|---|---|---|---|---|---|
| stripe #21 | 0 | 5 | 3 | 1 | 0 | 4 | 2 | 5 |
| stripe #22 | 2 | 0 | 5 | 3 | 1 | 2 | 4 | 0 |
| stripe #23 | 4 | 2 | 0 | 5 | 3 | 1 | 4 | 2 |
| stripe #24 | 6 | 4 | 2 | 0 | 5 | 3 | 1 | 4 |
| stripe #25 | 1 | 1 | 4 | 2 | 0 | 5 | 3 | 1 |
| stripe #26 | 3 | 1 | 3 | 4 | 2 | 0 | 5 | 1 |
| stripe #27 | 5 | 3 | 1 | 5 | 4 | 2 | 0 | 3 |
| stripe #28 | 0 | 4 | 1 | 5 | 2 | 0 | 3 | 4 |
| stripe #29 | 3 | 0 | 4 | 1 | 5 | 2 | 3 | 0 |
| stripe #30 | 6 | 3 | 0 | 4 | 1 | 5 | 2 | 3 |
| stripe #31 | 2 | 2 | 3 | 0 | 4 | 1 | 5 | 2 |
| stripe #32 | 5 | 2 | 5 | 3 | 0 | 4 | 1 | 2 |
| stripe #33 | 1 | 5 | 2 | 1 | 3 | 0 | 4 | 5 |
| stripe #34 | 4 | 1 | 5 | 2 | 4 | 3 | 0 | 1 |
| stripe #35 | 0 | 1 | 2 | 3 | 4 | 5 | 0 | 1 |
| stripe #36 | 6 | 0 | 1 | 2 | 3 | 4 | 5 | 0 |
| stripe #37 | 5 | 5 | 0 | 1 | 2 | 3 | 4 | 5 |
| stripe #38 | 4 | 5 | 4 | 0 | 1 | 2 | 3 | 5 |
| stripe #39 | 3 | 4 | 5 | 3 | 0 | 1 | 2 | 4 |
| stripe #40 | 2 | 3 | 4 | 5 | 2 | 0 | 1 | 3 |
| stripe #41 | 1 | 2 | 3 | 4 | 5 | 1 | 0 | 2 |

FIG. 12A

| | TO BE RESTORED | READ DISK ID | WRITE DISK ID | Disk #2 | Disk #3 | Disk #4 | Disk #5 | Disk #6 |
|---|---|---|---|---|---|---|---|---|
| 1 | 0 (stripe #1) | 2, 6 | 3, 4, 5 | | | | | |
| 2 | 1 (stripe #2) | 2, 3 | 4, 5, 6 | | | | | |
| 3 | 2 (stripe #3) | 2, 3 | 4, 5, 6 | | | | | |
| 4 | 3 (stripe #4) | 5, 6 | 2, 3, 4 | | | | | |
| 5 | 4 (stripe #5) | 2, 6 | 3, 4, 5 | | | | | |
| 6 | 5 (stripe #6) | 2, 3 | 4, 5, 6 | | | | | |
| 7 | 3 (stripe #7) | 4, 6 | 2, 3, 5 | | | | | |
| 8 | 0 (stripe #8) | 4, 6 | 2, 3, 5 | | | | | |
| 9 | 4 (stripe #9) | 3, 6 | 2, 4, 5 | | | | | |
| 10 | 1 (stripe #10) | 3, 6 | 2, 4, 5 | | | | | |
| 11 | 5 (stripe #11) | 3, 5 | 2, 4, 6 | | | | | |
| 12 | 2 (stripe #12) | 3, 5 | 2, 4, 6 | | | | | |
| 13 | 2 (stripe #14) | 3, 4 | 2, 5, 6 | | | | | |
| 14 | 0 (stripe #15) | 2, 5 | 3, 4, 6 | | | | | |
| 15 | 5 (stripe #16) | 4, 5 | 2, 3, 6 | | | | | |
| 16 | 3 (stripe #17) | 2, 5 | 3, 4, 6 | | | | | |
| 17 | 1 (stripe #18) | 4, 5 | 2, 3, 6 | | | | | |
| 18 | 4 (stripe #20) | 4, 5 | 2, 3, 6 | | | | | |
| 19 | 5 (stripe #21) | 2, 5 | 3, 4, 6 | | | | | |
| 20 | 0 (stripe #22) | 4, 5 | 2, 3, 6 | | | | | |
| 21 | 2 (stripe #23) | 2, 5 | 3, 4, 6 | | | | | |

FIG. 12B

| | TO BE RESTORED | READ DISK ID | WRITE DISK ID | Disk #2 | Disk #3 | Disk #4 | Disk #5 | Disk #6 |
|---|---|---|---|---|---|---|---|---|
| 22 | 4 (stripe #24) | 4, 5 | 2, 3, 6 | | | | | |
| 23 | 1 (stripe #26) | 4, 5 | 2, 3, 6 | | | | | |
| 24 | 3 (stripe #27) | 3, 4 | 2, 5, 6 | | | | | |
| 25 | 4 (stripe #28) | 3, 6 | 2, 4, 5 | | | | | |
| 26 | 0 (stripe #29) | 3, 5 | 2, 4, 6 | | | | | |
| 27 | 3 (stripe #30) | 3, 5 | 2, 4, 6 | | | | | |
| 28 | 2 (stripe #32) | 4, 6 | 2, 3, 5 | | | | | |
| 29 | 5 (stripe #33) | 4, 6 | 2, 3, 5 | | | | | |
| 30 | 1 (stripe #34) | 3, 6 | 2, 4, 5 | | | | | |
| 31 | 1 (stripe #35) | 2, 6 | 3, 4, 5 | | | | | |
| 32 | 0 (stripe #36) | 2, 3 | 4, 5, 6 | | | | | |
| 33 | 5 (stripe #38) | 2, 6 | 3, 4, 5 | | | | | |
| 34 | 4 (stripe #39) | 2, 3 | 4, 5, 6 | | | | | |
| 35 | 3 (stripe #40) | 2, 3 | 4, 5, 6 | | | | | |
| 36 | 2 (stripe #41) | 5, 6 | 2, 3, 4 | | | | | |
| 37 | 0 (stripe #0) | 5, 6 | 2, 3, 4 | | | | | |
| 38 | 3 (stripe #13) | 3, 5 | 2, 4, 6 | | | | | |
| 39 | 4 (stripe #19) | 3, 4 | 2, 5, 6 | | | | | |
| 40 | 1 (stripe #25) | 3, 4 | 2, 5, 6 | | | | | |
| 41 | 2 (stripe #31) | 3, 5 | 2, 4, 6 | | | | | |
| 42 | 5 (stripe #37) | 5, 6 | 2, 3, 4 | | | | | |

FIG. 13

|  | Disk #2 | Disk #3 | Disk #4 | Disk #5 | Disk #6 | TOTAL |
|---|---|---|---|---|---|---|
| NUMBER OF READS | 14 | 20 | 14 | 20 | 16 | 86 |
| NUMBER OF ACCESS EVENTS | 25 | 25 | 25 | 25 | 25 | 125 |
| NUMBER OF WRITES | 11 | 5 | 11 | 5 | 9 | 41 |

FIG. 14

|  | Disk #2 | Disk #3 | Disk #4 | Disk #5 | Disk #6 |
|---|---|---|---|---|---|
| NUMBER OF POSSIBLE WRITES | 28 | 22 | 28 | 22 | 26 |
| NUMBER OF WRITES | 11 | 5 | 11 | 5 | 9 |
| RATE | 0.39286 | 0.2273 | 0.39286 | 0.2273 | 0.3462 |

FIG. 15

|  | Disk #2 | Disk #3 | Disk #4 | Disk #5 | Disk #6 |
|---|---|---|---|---|---|
| NUMBER OF POSSIBLE WRITES | 28 | 22 | 28 | 22 | 26 |
| NUMBER OF WRITES | 11 | 5 | 11 | 5 | 9 |
| RATE | 0.39286 | 0.2273 | 0.39286 | 0.2273 | 0.3462 |
|  | 3 (stripe 4) |  |  |  |  |

FIG. 16

|  | Disk #2 | Disk #3 | Disk #4 | Disk #5 | Disk #6 |
|---|---|---|---|---|---|
| NUMBER OF POSSIBLE WRITES | 27 | 21 | 27 | 22 | 26 |
| NUMBER OF WRITES | 10 | 5 | 11 | 5 | 9 |
| RATE | 0.3704 | 0.2381 | 0.4074 | 0.2273 | 0.3462 |

FIG. 17

|  | Disk #2 | Disk #3 | Disk #4 | Disk #5 | Disk #6 |
|---|---|---|---|---|---|
| NUMBER OF POSSIBLE WRITES | 27 | 21 | 27 | 22 | 26 |
| NUMBER OF WRITES | 10 | 5 | 11 | 5 | 9 |
| RATE | 0.3704 | 0.2381 | 0.4074 | 0.2273 | 0.3462 |
|  |  |  | 0 (stripe 1) |  |  |

FIG. 18

|  | Disk #2 | Disk #3 | Disk #4 | Disk #5 | Disk #6 |
|---|---|---|---|---|---|
| NUMBER OF READS | 14 | 20 | 14 | 20 | 16 |
|  | 3 (stripe #4) | 5 (stripe #16) | 0 (stripe #1) | 1 (stripe #10) | 5 (stripe #6) |
|  | 3 (stripe #7) | 5 (stripe #21) | 1 (stripe #1) | 4 (stripe #28) | 5 (stripe #11) |
|  | 0 (stripe #8) | 4 (stripe #24) | 2 (stripe #3) | 5 (stripe #33) | 0 (stripe #15) |
|  | 4 (stripe #9) | 1 (stripe #35) | 4 (stripe #5) | 5 (stripe #38) | 1 (stripe #18) |
|  | 2 (stripe #14) | 2 (stripe #41) | 2 (stripe #12) | 4 (stripe #19) | 0 (stripe #22) |
|  | 4 (stripe #20) |  | 3 (stripe #17) |  | 1 (stripe #26) |
|  | 3 (stripe #27) |  | 2 (stripe #23) |  | 3 (stripe #30) |
|  | 0 (stripe #29) |  | 1 (stripe #34) |  | 3 (stripe #40) |
|  | 2 (stripe #32) |  | 0 (stripe #36) |  | 1 (stripe #25) |
|  | 0 (stripe #0) |  | 4 (stripe #39) |  |  |
|  | 2 (stripe #31) |  | 3 (stripe #13) |  |  |
| NUMBER OF WRITES | 11 | 5 | 11 | 5 | 9 |
| NUMBER OF ACCESS EVENTS | 25 | 25 | 25 | 25 | 25 |

FIG. 19

|  | Disk #2 | Disk #3 | Disk #4 | Disk #5 | Disk #6 |
|---|---|---|---|---|---|
| NUMBER OF READS | 14 | 20 | 14 | 20 | 16 |
|  | 3 (stripe #4) | 5 (stripe #16) | 0 (stripe #1) | 1 (stripe #10) | 5 (stripe #6) |
|  | 3 (stripe #7) | 5 (stripe #21) | 1 (stripe #1) | 4 (stripe #28) | 5 (stripe #11) |
|  | 0 (stripe #8) | 4 (stripe #24) | 2 (stripe #3) | 5 (stripe #33) | 0 (stripe #15) |
|  | 4 (stripe #9) | 1 (stripe #35) | 4 (stripe #5) | 5 (stripe #38) | 1 (stripe #18) |
|  | 2 (stripe #14) | 2 (stripe #41) | 2 (stripe #12) | 4 (stripe #19) | 0 (stripe #22) |
|  | 4 (stripe #20) |  | 3 (stripe #17) |  | 1 (stripe #26) |
|  | 3 (stripe #27) |  | 2 (stripe #23) |  | 3 (stripe #30) |
|  | 0 (stripe #29) |  | 1 (stripe #34) |  | 3 (stripe #40) |
|  | 2 (stripe #32) |  | 0 (stripe #36) |  | 1 (stripe #25) |
|  | 0 (stripe #0) |  | 4 (stripe #39) |  |  |
|  | 2 (stripe #31) |  | 3 (stripe #13) |  |  |
|  | 5 (stripe #37) |  |  |  |  |
| NUMBER OF WRITES | 12 | 5 | 11 | 5 | 9 |
| NUMBER OF ACCESS EVENTS | 26 | 25 | 25 | 25 | 25 |

FIG. 21A mod (5) ADDITION

| + | 0 | 1 | 2 | 3 | 4 | |
|---|---|---|---|---|---|---|
| 0 | 0 | 1 | 2 | 3 | 4 | SHIFT #0 |
| 1 | 1 | 2 | 3 | 4 | 0 | SHIFT #1 |
| 2 | 2 | 3 | 4 | 0 | 1 | SHIFT #2 |
| 3 | 3 | 4 | 0 | 1 | 2 | SHIFT #3 |
| 4 | 4 | 0 | 1 | 2 | 3 | SHIFT #4 |

FIG. 21B mod (5) MULTIPLICATION

| × | 0 | 1 | 2 | 3 | 4 | |
|---|---|---|---|---|---|---|
| 0 | 0 | 0 | 0 | 0 | 0 | PATTERN #0 |
| 1 | 0 | 1 | 2 | 3 | 4 | PATTERN #1 |
| 2 | 0 | 2 | 4 | 1 | 3 | PATTERN #2 |
| 3 | 0 | 3 | 1 | 4 | 2 | PATTERN #3 |
| 4 | 0 | 4 | 3 | 2 | 1 | PATTERN #4 |

FIG. 22

| STRIPE ID | DISK ID | | | | | |
|---|---|---|---|---|---|---|
| | #0 | #1 | #2 | #3 | #4 | |
| #0 | 0 | 1 | 2 | 3 | 4 | PATTERN #0 |
| #1 | 10 | 11 | 12 | 13 | 14 | |
| #2 | 20 | 21 | 22 | 23 | 24 | |
| #3 | 30 | 31 | 32 | 33 | 34 | |
| #4 | 1 | 2 | 3 | 4 | 0 | PATTERN #1 |
| #5 | 12 | 13 | 14 | 10 | 11 | |
| #6 | 23 | 24 | 20 | 21 | 22 | |
| #7 | 34 | 30 | 31 | 32 | 33 | |
| #8 | 2 | 3 | 4 | 0 | 1 | PATTERN #2 |
| #9 | 14 | 10 | 11 | 12 | 13 | |
| #10 | 21 | 22 | 23 | 24 | 20 | |
| #11 | 33 | 34 | 30 | 31 | 32 | |
| #12 | 3 | 4 | 0 | 1 | 2 | PATTERN #3 |
| #13 | 11 | 12 | 13 | 14 | 10 | |
| #14 | 24 | 20 | 21 | 22 | 23 | |
| #15 | 32 | 33 | 34 | 30 | 31 | |
| #16 | 4 | 0 | 1 | 2 | 3 | PATTERN #4 |
| #17 | 13 | 14 | 10 | 11 | 12 | |
| #18 | 22 | 23 | 24 | 20 | 21 | |
| #19 | 31 | 32 | 33 | 34 | 30 | |

FIG. 23

| STRIPE ID | DISK ID | | | | |
|---|---|---|---|---|---|
| | #0 | #1 | #2 | #3 | #4 |
| #0 | 0 | 4 | 8 | 12 | 16 |
| #1 | 20 | 24 | 28 | 32 | 36 |
| #2 | 40 | 44 | 48 | 52 | 56 |
| #3 | 60 | 64 | 68 | 72 | 76 |
| #4 | 5 | 9 | 13 | 17 | 1 |
| #5 | 29 | 33 | 37 | 21 | 25 |
| #6 | 53 | 57 | 41 | 45 | 49 |
| #7 | 77 | 61 | 65 | 69 | 73 |
| #8 | 10 | 14 | 18 | 2 | 6 |
| #9 | 38 | 22 | 26 | 30 | 34 |
| #10 | 46 | 50 | 54 | 58 | 42 |
| #11 | 74 | 78 | 62 | 66 | 70 |
| #12 | 15 | 19 | 3 | 7 | 11 |
| #13 | 27 | 31 | 35 | 39 | 23 |
| #14 | 59 | 43 | 47 | 51 | 55 |
| #15 | 71 | 75 | 79 | 63 | 67 |
| #16 |  | 0 | 5 | 10 | 15 |
| #17 |  | 38 | 20 | 27 | 29 |
| #18 |  | 53 | 59 | 40 | 46 |
| #19 |  | 71 | 74 | 77 | 60 |

FIG. 24

| STRIPE ID | DISK ID | | | | |
|---|---|---|---|---|---|
| | #0 | #1 | #2 | #3 | #4 |
| #0 | 0 | 4 | 3 | 2 | 1 |
| #1 | 5 | 4 | 5 | 7 | 6 |
| #2 | 10 | 9 | 8 | 10 | 11 |
| #3 | 15 | 14 | 13 | 12 | 15 |
| #4 | | 19 | 18 | 17 | 16 |
| #5 | 20 | 22 | 20 | 21 | 23 |
| #6 | 27 | 24 | 26 | 27 | 25 |
| #7 | 29 | 31 | 28 | 30 | 29 |
| #8 | | 33 | 35 | 32 | 34 |
| #9 | 38 | 38 | 37 | 39 | 36 |
| #10 | 40 | 43 | 41 | 40 | 42 |
| #11 | 46 | 44 | 47 | 45 | 46 |
| #12 | | 50 | 48 | 51 | 49 |
| #13 | 53 | 53 | 54 | 52 | 55 |
| #14 | 59 | 57 | 59 | 58 | 56 |
| #15 | 60 | 61 | 62 | 63 | 60 |
| #16 | | 64 | 65 | 66 | 67 |
| #17 | 71 | 71 | 68 | 69 | 70 |
| #18 | 74 | 75 | 74 | 72 | 73 |
| #19 | 77 | 78 | 79 | 77 | 76 |

FIG. 25A

GF($2^2$) ADDITION

| + | 0 / 00 | 1 / 01 | α / 10 | α+1 / 11 |
|---|---|---|---|---|
| 0 / 00 | 0 / 00 | 1 / 01 | α / 10 | α+1 / 11 |
| 1 / 01 | 1 / 01 | 0 / 00 | α+1 / 11 | α / 10 |
| α / 10 | α / 10 | α+1 / 11 | 0 / 00 | 1 / 01 |
| α+1 / 11 | α+1 / 11 | α / 10 | 1 / 01 | 0 / 00 |

FIG. 25B

GF($2^2$) MULTIPLICATION

| · | 0 / 00 | 1 / 01 | α / 10 | α+1 / 11 |
|---|---|---|---|---|
| 0 / 00 | 0 / 00 | 0 / 00 | 0 / 00 | 0 / 00 |
| 1 / 01 | 0 / 00 | 1 / 01 | α / 10 | α+1 / 11 |
| α / 10 | 0 / 00 | α / 10 | α+1 / 11 | 1 / 01 |
| α+1 / 11 | 0 / 00 | α+1 / 11 | 1 / 01 | α / 10 |

FIG. 26A

GF($2^2$) ADDITION

| + | 0 | 1 | 2 | 3 | |
|---|---|---|---|---|---|
| 0 | 0 | 1 | 2 | 3 | SHIFT #0 |
| 1 | 1 | 0 | 3 | 2 | SHIFT #1 |
| 2 | 2 | 3 | 0 | 1 | SHIFT #2 |
| 3 | 3 | 2 | 1 | 0 | SHIFT #3 |

FIG. 26B

GF($2^2$) MULTIPLICATION

| + | 0 | 1 | 2 | 3 | |
|---|---|---|---|---|---|
| 0 | 0 | 0 | 0 | 0 | PATTERN #0 |
| 1 | 0 | 1 | 2 | 3 | PATTERN #1 |
| 2 | 0 | 2 | 3 | 1 | PATTERN #2 |
| 3 | 0 | 3 | 1 | 2 | PATTERN #3 |

STORAGE CONTROL DEVICE AND STORAGE CONTROL METHOD

CROSS-REFERENCE TO RELATED APPLICATION

This application is based upon and claims the benefit of priority of the prior Japanese Patent Application No. 2014-162259, filed on Aug, 8, 2014, the entire contents of which are incorporated herein by reference.

FIELD

The embodiment discussed herein is related to a storage control device and a storage control method.

BACKGROUND

Disk array devices making use of redundant array of inexpensive disks (RAID) technology are known, by way of example, as storage devices. In the disk array devices, redundant data is stored so as to be distributed across multiple hard disk drives (HDDs), and thus increased speed and fault tolerance may be securely achieved.

A disk array device includes, for example, multiple HDDs, and information representative of redundant data in the disk array device includes, for example, data and parity. Hereinafter, each HDD of a disk array device is sometimes referred to simply as a "disk".

In the case where a disk in a disk array device fails, a rebuild process of restoring information in the failed disk by making use of data redundancy is performed. As techniques related to the rebuild process, for example, the following techniques are mentioned.

There is known a failure recovery method for recovering data of a failed drive by making use of a free area of a disk system (for example, refer to Japanese Laid-open Patent Publication No. 6-230903). In this failure recovery method, in a disk array device including a plurality of disk devices, error correction data for a collection of data to be written is generated from the collection of data, and the collection of write data and the error correction data are stored so as to be distributed over multiple disk devices. Data of a disk device that has failed is recovered from other data of the collection of write data and the error correction data stored on non-failed disk devices, and the recovered data is stored so as to be distributed across free areas of normal disk devices.

There is also known a disk array device with which, when a failure occurs in a magnetic disk, a delay in a data recovery process due to access loads of other magnetic disks is reduced (for example, refer to Japanese Laid-open Patent Publication No. 2005-38271). This disk array device has two kinds of parity data and a plurality of data recovery methods, and, in the case of a single magnetic disk failure, selects a data recovery method in which a magnetic disk that has degenerated and a magnetic disk with the largest load may be excluded for data recovery processing.

There is also known a disk array device that has a two-parity configuration and in which the parity and data of restoration sources are used on a rotation basis when read operations for error correction are carried out during a failure of one HDD (for example, refer to Japanese Laid-open Patent Publication No. 2006-260446).

In recent years, the capacities of disks have been increasing, and the time taken for restoring information of one disk through a rebuild process has increased significantly. For this reason, it is desired to increase the speed of the rebuild process.

However, in the case where, among a plurality of disks in which information areas that store information and spare areas are allocated, more disks than the number of spare areas fail, it is not easy to appropriately perform a rebuild process.

Such a problem arises not only in disk array devices using HDDs as storage devices but also in storage devices using other types of storage devices.

SUMMARY

According to an aspect of the invention, a storage control apparatus includes a controller configured to determine whether more storage devices, among a plurality of storage devices across which a plurality of information areas storing information representing redundant data and one or more spare areas are distributed, than the number of the spare areas fail, and perform a rebuild process of information stored in a plurality of information areas of a failed first storage device included in the plurality of combinations of the plurality of information areas and the one or more spare areas, when determining that the more storage devices than the spare areas fail, the rebuild process including restoring information corresponding to one information area of the failed first storage device included in one combination among the plurality of combinations, and determining a write destination storage device to which the restored information is to be written in accordance with the number of times information is read from a non-failed second storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A and FIG. 1B are diagrams illustrating rebuild processes;

FIG. 2 is a diagram illustrating a disk array device in which data is stored in a distributed manner;

FIG. 3 is a diagram depicting an allocation pattern of two redundant sets of RAID 5 (2+1) and an HS area;

FIG. 4 is a diagram depicting an allocation pattern in which two redundant sets of RAID 5 (2+1) and an HS area are distributed;

FIG. 5 is a diagram depicting a conversion table;

FIGS. 6A and 6B are diagrams depicting objects to be restored when one disk fails;

FIG. 9 is a diagram of a configuration of a storage system;

FIGS. 10A and 10B are diagrams depicting information to be restored when two disks fail;

FIGS. 12A and 12B are diagrams depicting the processing of obtaining the number of possible writes;

FIG. 13 is a diagram depicting the number of writes;

FIG. 14 is a diagram depicting rates of the numbers of writes with respect to the number of possible writes;

FIG. 15 is a diagram depicting an object to be restored assigned to Disk #2;

FIG. 16 is a diagram depicting recalculated rates;

FIG. 17 is a diagram depicting an object to be restored assigned to Disk #4;

FIG. 18 is a diagram depicting write destination disks of 41 objects to be restored;

FIG. 19 is a diagram depicting write destination disks of 42 objects to be restored;

FIG. 21A depicts a table of mod (5) addition, and FIG. 21B depicts a table of mod (5) multiplication;

FIG. 22 is a diagram depicting an allocation pattern in which information areas of RAID 5 (3+1) and an HS area are distributed;

FIG. 23 is a diagram depicting an allocation pattern in which the same four integers are replaced with different integers;

FIG. 24 is a diagram depicting an allocation pattern in which integers in each column are reallocated;

FIGS. 25A and 25B are diagrams depicting tables of $GF(2^2)$ addition and GF $(2^2)$ multiplication;

FIGS. 26A and 26B are diagrams depicting tables of $GF(2^2)$ addition and $GF(2^2)$ multiplication in which a member is replaced with an integer.

DESCRIPTION OF EMBODIMENT

Figure 7:
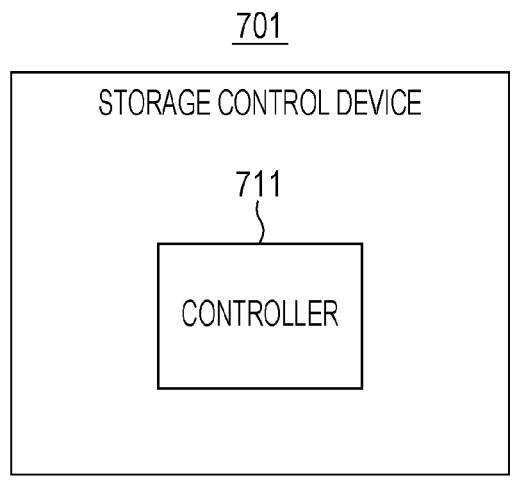
FIG. 7 is a diagram of a configuration of a storage control device.

Hereinafter, an embodiment will be described in detail with reference to the accompanying drawings.

FIG. 1A illustrates an example of a rebuild process in the case where, in a RAID 1 disk array device, a disk 101-1 of mirrored disks 101-1 and 101-2 fails. In this case, read operations for reading information from disk 101-2 that has not failed (hereinafter, a disk or a storage device that has not failed is sometimes referred to as a "non-failed disk" or a "non-failed storage device") and write operations for writing information to a spare disk 102 (hot spare: HS) cause bottlenecks.

In the case where information is read from one disk and written to the same or another disk, the performance of both the read processing and the write processing never exceeds the throughput of one disk. For example, when the throughput of read operations and the throughput of write operations of one disk are both 100 megabytes/s, the maximum throughput of a rebuild process is also 100 megabytes/s.

FIG. 1B illustrates an example of a rebuild process in the case where, in a RAID 5 disk array device, a disk 111-1 of disk 111-1 to disk 111-4 fails. In this case, since information is read from three disks, whereas information is written to one disk, write operations cause a bottleneck. Information may be read concurrently from the non-failed disks of disk 111-2 to disk 111-4. However, in order to restore a given amount of information, content corresponding to three times the given amount is concurrently read.

For example, in order to restore information of 100 megabytes, information totaling 300 megabytes, 100 megabytes per disk, is read from three disks. In the case where the throughput of a read operation and the throughput of a write operation of one disk are both 100 megabytes/s, information is read at 100 megabytes/s from each of disk 111-2 to disk 111-4 in order to write information to the disk 112 at 100 megabytes/s. In this way, also in the disk array device of FIG. 1B, the performance of a rebuild process never exceeds the throughput of one disk.

FIG. 2 illustrates an example of a disk array device capable of restoring information faster than the rebuild processes of FIG. 1A and FIG. 1B. In the disk array device of FIG. 2, redundant data of RAID 5 (2+1) is stored so as to be distributed across disk 201-1 to disk 201-7. RAID 5 (n+1) represents a data configuration (redundant set) of RAID 5 in which one piece of parity is present with respect to n pieces of distributed data.

SEC 1 to SEC 3 represent information areas corresponding to three sets of data and parity, and an HS area represents a spare area to which restored information is to be written. The information area and the spare area are areas having given sizes. In the example of FIG. 2, each set of four areas, in which one HS area is added to three information areas corresponding to redundant data, are distributed across disk 201-1 to disk 201-7. In reality, more sets of four areas than the number of sets of four areas in the example of FIG. 2 are equally distributed across seven disks.

Here, when disk 201-7 fails, a rebuild process is performed using information stored on the disks of disk 201-1 to disk 201-6, and the restored information is written to the HS areas of any of the disks of disk 201-1 to disk 201-6. In this case, for each disk, the ratio of the number of information areas from which information is read to the number of HS areas to which information is written is 2 to 1, and the ratio of the throughput of a read operation to a write operation is also 2 to 1.

In the case where the throughput of a read operation and the throughput of a write operation of one disk are both 100 megabytes/s, the throughput of a read operation of each disk of FIG. 2 is 100×(⅔)=about 66 megabytes/s. The throughput of a write operation of each disk is 100×(⅓)=about 33 megabytes/s. Accordingly, write operations cause a bottleneck, and the throughput of a rebuild process of each disk may be regarded to be 33 megabytes/s. The disks of disk 201-1 to disk 201-6 are capable of being accessed concurrently and therefore the throughput of the entire disk array device is 33×6=about 200 megabytes/s.

In this way, increasing the number of disks included in a disk array device and equally distributing information areas and HS areas may increase the number of disks involved in a rebuild process during a disk failure. This results in an increase in the speed of the rebuild process. For example, in the case where 19 disks are provided, it is possible for a rebuild process to have a throughput of about 600 megabytes/s.

FIG. 3 depicts an example of an allocation pattern in which information areas corresponding to two redundant sets of RAID 5 (2+1) and one HS area are allocated across seven disks. Disk #0, Disk #1, and Disk #2 are disks of a RAID group for content of redundant set #0, and Disk #3, Disk #4, and Disk #5 are disks of the RAID group for content of redundant set #1. Disk #6 is a spare disk having HS areas for redundant set #0 and redundant set #1.

Each of 42 stripes (stripe #0 to stripe #41) includes three information areas of redundant set #0, three information areas of redundant set #1, and one HS area and represents a combination of the information areas and the HS area. Integers 0 to 167 in the information areas represent the order of data, and Pi (i=0 to 83) represents parity for ensuring the integrity between two pieces of data of the corresponding redundancy set within each stripe. For example, parity P0 of stripe #0 is generated from data 0 and data 1 of redundancy set #0, and parity P1 is generated from data 2 and data 3 of redundancy set #1.

HSj (j being an integer of 0 or more) represents an HS area included in stripe #j. In this example, HS areas of all the stripes are allocated in Disk #6, and therefore write operations are concentrated in Disk #6.

FIG. 4 depicts an example of an allocation pattern in which the information areas and HS areas of FIG. 3 are equally distributed across seven disks, while allocation of information areas and an HS area in one stripe shifts for each stripe. For example, in stripe #0, information of redundant set #0 is allocated in Disk #5, Disk #6, and Disk #0, information of redundant set #1 is allocated in Disk #2, Disk #3, and Disk #4, and HS area HS0 is allocated in Disk #1. In each of the subsequent stripes, an HS area moves to the next right disk. Distributing information areas and HS areas in this way may increase the speed of a rebuild process similarly to the case of FIG. 2.

FIG. 5 depicts an example of a conversion table for converting the allocation pattern of FIG. 3 to the allocation pattern of FIG. 4. Each row of the conversion table of FIG. 5 corresponds to each stripe of FIG. 3, and each column corresponds to each disk of FIG. 3. Each cell of the conversion table of FIG. 5 represents a disk of FIG. 4 having the corresponding area of FIG. 3. For example, the information area of data 1 corresponding to stripe #0 and Disk #1 of FIG. 3 is allocated in Disk #6 according to the conversion table.

The conversion table may be generated, for example, based on the theory of Galois extensions as described below with reference to FIG. 21 to FIG. 26. A conversion table based on the theory of Galois extensions is generated so that when any disk fails, the loads of all the disks in a rebuild process are equalized within a range of a prescribed number of stripes. The load of a disk varies in accordance with the number of read operations and write operations carried out in the rebuild process. The prescribed number of stripes is determined based on the number of disks included in a RAID group and the number of HS areas. For example, in the example of FIG. 4, the prescribed number of stripes is 42.

FIG. 6A and FIG. 6B depict items to be restored when one disk fails in a disk array device in which the allocation pattern of FIG. 4 is employed. Each of 42 stripes (stripe #0 to stripe #41) represents a combination of information areas and an HS area.

FIG. 6A and FIG. 6B depict information areas and HS areas using a notation different from that of FIG. 4. Among integers 0 to 6 common to 42 stripes, integers 0, 1, and 2 represent information of redundant set #0, integers 3, 4, and 5 represent information of redundant set #1, and integer 6 represents an HS area. The same integers, 0 to 5, in different stripes correspond to different pieces of information, and the same integers, 6, in different stripes correspond to different HS areas.

In this distribution, when Disk #0 fails, an object to be restored varies for each stripe. Depending on a stripe, there is no object to be restored.

For example, since, in stripe #0, the information area of information 0 is allocated in failed Disk #0, an object to be restored is information 0. Information 0 is included in redundant set #0, and therefore information to be read for restoration is information 1 and information 2, which are stored on Disk #6 and Disk #5, respectively. Consequently, in order to read information 1 and information 2, each of Disk #6 and Disk #5 is accessed once. In contrast, since HS area 6 to which the restored information 0 is to be written is allocated in Disk #1, Disk #1 is accessed once.

Since, in stripe #4, the information area of information 4 is allocated in the failed Disk #0, the object to be restored is information 4. Information 4 is included in redundant set #1, and therefore information to be read for restoration is information 3 and information 5, which are stored on Disk #1 and Disk #6, respectively. Consequently, in order to read information 3 and information 5, each of Disk #1 and Disk #6 is accessed once. In contrast, since HS area 6 to which the restored information 4 is to be written is allocated in Disk #5, Disk #5 is accessed once.

In stripe #6, stripe #12, stripe #18, stripe #24, stripe #30, and stripe #36, since HS area 6 is allocated in the failed Disk #0, there is no object to be restored. Consequently, there is no access to any disk.

Once, the number of disk access events in 42 stripes in the rebuild process is counted for each disk, the access count for every disk of Disk #1 to Disk #6 is 18. Accordingly, the loads of all the disks in the rebuild process are equalized within the range of 42 stripes.

The number of stripes in which an object is to be restored is 36. Therefore, if information areas and HS areas are not distributed, it is considered that, in a rebuild process of 36 stripes, 36 access events are performed to read source disks and write destination disks. In this case, the number of access events in each disk related to the rebuild process is 36.

In contrast, in the case where the allocation pattern of FIG. 6A and FIG. 6B is employed, the number of access events in each disk is 18, and therefore the throughput of the rebuild process doubles.

However, the total capacity of HS areas distributed across Disk #0 to Disk #6 is equal to the capacity of one disk, and therefore the HS areas have already been used after information of failed Disk #0 was restored. For this reason, if, after redundant data is recovered by the rebuild process, another disk fails, a way of performing a rebuild process using other free areas instead of HS areas is considered.

At this point, there is a possibility that the access count for each disk increases or decreases depending on a disk whose free area is used for a rebuild process. Therefore, it is desirable to select an appropriate disk used for the rebuild process to access storage devices more efficiently.

FIG. 7 illustrates an example of a configuration of a storage control device according to the embodiment. A storage control device 701 of FIG. 7 includes a controller 711.

Figure 8:
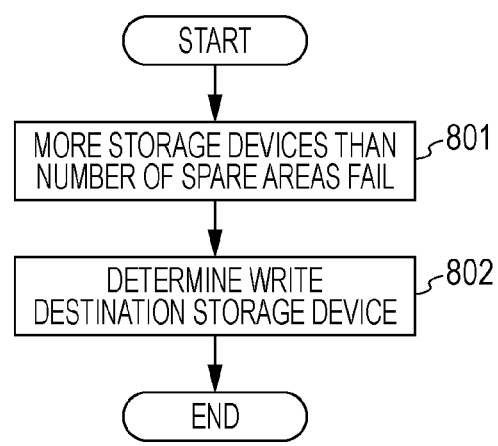
FIG. 8 is a flowchart of a storage control process.

FIG. 8 is a flowchart illustrating an example of a storage control process performed by the controller 711 of FIG. 7. When, among a plurality of storage devices across which a plurality of information areas that store information representative of redundant data and one or more spare areas are distributed, the controller 711 determines whether more storage devices than the number of spare areas fail. When the controller 711 determines that the more storage devices than the number of spare areas fail (step 801), processing of step 802 is performed. In step 802, the controller 711 determines a write destination storage device in a restoration process (step 802).

The restoration process is a restoration process for a plurality of information areas of a failed first storage device included in a plurality of combinations of the plurality of information areas and the one or more spare areas. The write destination storage device is a write destination storage device to which restored information corresponding to one information area of the first storage device is written, the one information area being included in one combination of the plurality of combinations.

The controller 711 determines the write destination storage device based on the number of times information is read from a non-failed second storage device.

According to such a storage control device, when more storage devices than the number of spare areas fail, access to the storage devices during restoration of information may be performed more efficiently.

FIG. 9 illustrates an example of a configuration of a storage system including the storage control device 701 of FIG. 7. The storage system of FIG. 9 includes a host device 901 and a storage device 902. The storage device 902 includes a storage control device 911, a storage control device 912, and a disk enclosure (DE) 913.

The host device 901 is coupled via a communications line to the storage control device 911 and the storage control device 912, and the storage control device 911 and the storage control device 912 are coupled via a communications line to the DE 913.

The storage control device 911 includes an interface (IF) 921, a controller 922, and an IF 923. The controller 922 includes a restoration unit 924, a rebuild controller 925, a command issue controller 926, and a storage unit 927.

The storage control device 912 includes an IF 931, a controller 932, and an IF 933. The controller 932 includes a restoration unit 934, a rebuild controller 935, a command issue controller 936, and a storage unit 937.

The storage control device 911 and the storage control device 912 correspond to the storage control device 701 of FIG. 7, and the control unit 922 and the control unit 932 correspond to the control unit 711 of FIG. 7. The DE 913 includes disk 941-1 to disk 941-k (k being an integer of 4 or more).

The host device 901 is capable of reading data from disk 941-1 to disk 941-k and writing data to disk 941-1 to disk 941-k via the storage control device 911 or the storage control device 912.

In the storage system of FIG. 9, the access path from the host device 901 to the DE 913 is duplicated. If the access path is not duplicated, the storage control device 911 or the storage control device 912 may be omitted. A plurality of host devices may be coupled to the storage control device 911 and the storage control device 912.

The IF 921 of the storage control device 911 is a communications interface for communicating with the host device 901, and the IF 923 is a communications interface for communicating with the DE 913.

The controller 922 issues a read command to the DE 913 based on a read request received from the host device 901 and thus may read data from the DE 913 and transmit data to the host device 901. The controller 922 also issues a write command to the DE 913 based on a write request received from the host device 901 and thus may write data included in the write request to the DE 913.

The storage unit 927 may store allocation information, the number of reads, the number of writes, and the number of possible writes. The allocation information indicates an allocation pattern in which information areas and spare areas are distributed across disk 941-1 to disk 941-k. As the allocation information, for example, a conversion table as depicted in FIG. 5 may be used.

The number of reads represents the number of times information is read from a non-failed disk 941 in a rebuild process (restoration process), and the number of writes represents the number of times restored information is written to a non-failed disk 941 in a rebuild process. The number of possible writes represents the number of times restored information may be written to a non-failed disk 941 in a rebuild process.

The restoration unit 924 restores information of a failed disk 941 by using information read from a non-failed disk 941 based on an instruction from the rebuild controller 925. The rebuild controller 925 controls startup and completion of a rebuild process and selects, out of non-failed disks 941, the disk 941 as the write destination to which the restored information is to be written. At this point, the rebuild controller 925 determines the disk 941 as the write destination based on allocation information, the number of reads, the number of writes, and the number of possible writes.

The command issue controller 926 issues a read command or a write command to the DE 913 based on a read request or a write request received from the host device 901. The disk 941 to be accessed by using a read command or a write command is determined based on allocation information.

The command issue controller 926 issues a read command or a write command to the DE 913 based on an instruction from the rebuild controller 925. The disk 941 to be accessed by using a read command or a write command is specified by the rebuild controller 925. Among such disks, a disk to be accessed by using a write command is the disk 941 selected as the write destination by the rebuild controller 925.

Operations of the storage control device 912 are similar to the operations of the storage control device 911. The storage control device 911 and the storage control device 912 are coupled via a communications line and may communicate with each other.

Hereinafter, by way of example, operations performed when the storage control device 911 performs a rebuild process will be described. For example, when allocation information represents the allocation pattern of FIG. 4, k=7, and disk 941-1 to disk 941-7 in the DE 913 correspond to Disk #0 to Disk #6, respectively. Information areas and HS areas are distributed over some of the storage areas, disk 941-1 to disk 941-7, and other storage areas correspond to areas that are yet to be used (free areas).

Here, when Disk #0 fails, the controller 922 performs a rebuild process for restoring information of Disk #0 included in each stripe as depicted in FIG. 6A and FIG. 6B by using information of the corresponding redundant set in the stripe. Then, the controller 922 writes the restored information to HS areas in the stripe.

For example, in the case of restoring information 0 of Disk #0 included in stripe #0, the controller 922 restores information 0 by using information 1 and information 2 of Disk #6 and Disk #5 and writes the restored information to HS area 6 of Disk #1.

In addition, in the case of restoring information 4 of Disk #0 included in stripe #4, the controller 922 restores information 4 by using information 3 and information 5 of Disk #1 and Disk #6 and writes the restored information to HS area 6 of Disk #5.

However, in stripe #6, stripe #12, stripe #18, stripe #24, stripe #30, and stripe #36, since HS area 6 is allocated in Disk #0, restoration of information is not carried out.

As a result of such a rebuild process, restored information is written to all HS areas 6, and thus all HS areas 6 will have already been used.

When, after information of Disk #0 is restored, Disk #1 subsequently fails, the objects to be restored are as depicted in FIG. 10A and FIG. 10B. In this case, the controller 922 performs a rebuild process for information of Disk #1 included in each stripe by using information of the corresponding redundant set within the stripe. Then, the controller 922 writes the restored information to a free area of any disk of Disk #2 to Disk #6.

For example, in stripe #0, since the information area of information 0 is allocated in the failed Disk #1, the object to be restored is information 0. Since information 0 is included in redundant set #0, information to be read for restoration is information 1 and information 2, which are stored on Disk #6 and Disk #5, respectively. Therefore, the controller 922 restores information 0 by using information 1 and information 2 of Disk #6 and Disk #5 and writes the restored information to a free area of any disk.

In stripe #4, since the information area of information 3 is allocated in the failed Disk #1, the object to be restored is information 3. Since information 3 is included in redundant set #1, information to be read for restoration is information 4 and information 5, which are stored on Disk #5 and Disk #6, respectively. Therefore, the controller 922 restores information 3 by using information 4 and information 5 of Disk #5 and Disk #6 and writes the restored information to a free area of any disk.

In this way, in cases where more disks than the number of HS areas included in each stripe fail, the redundant data may be recovered by using free areas other than HS areas, as the write destinations.

Figure 11:
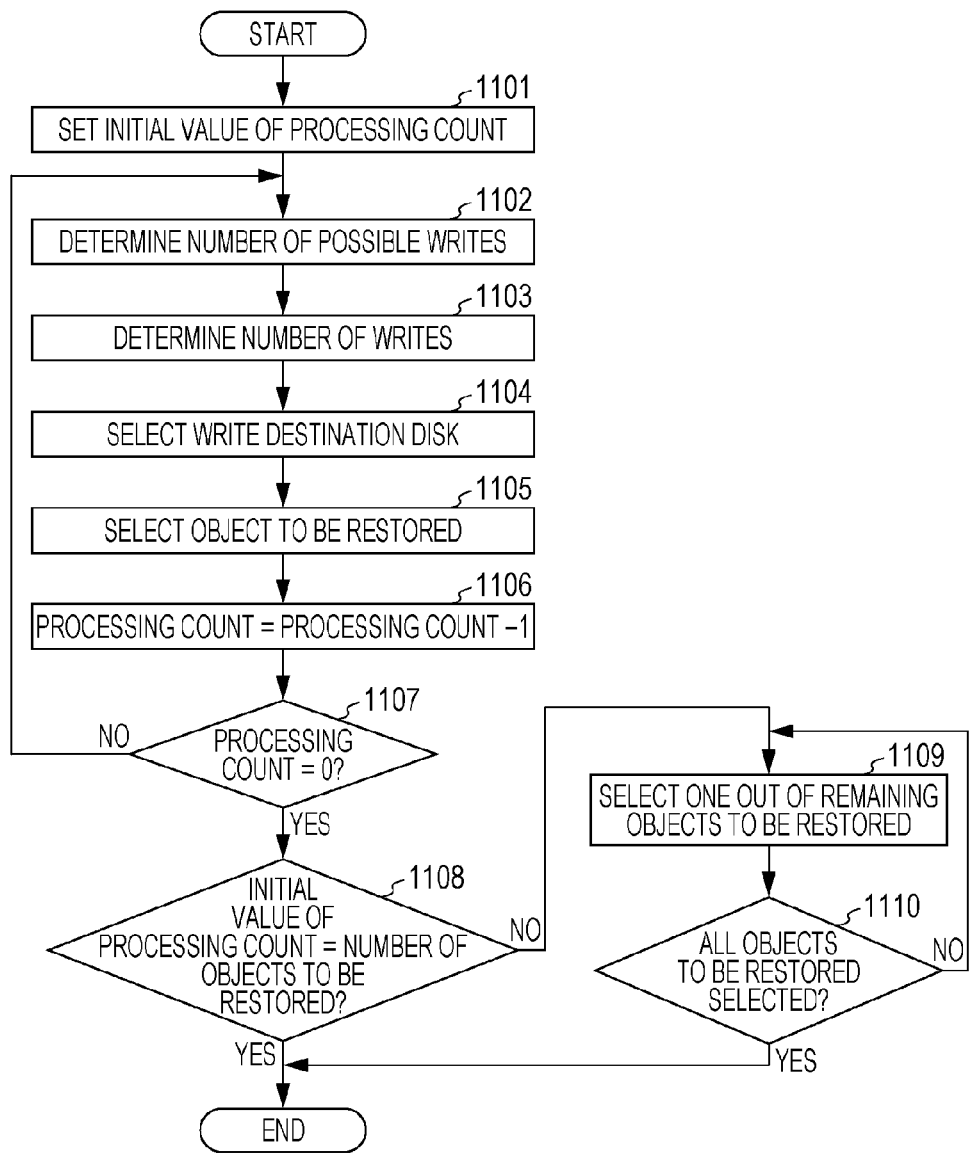
FIG. 11 is a flowchart of a write destination determination process.

FIG. 11 is a flowchart illustrating an example of a write destination determination process in which, in a rebuild process for restoring information of Disk #1, the rebuild controller 925 determines a disk to which each object to be restored is to be written (hereinafter referred to as "write destination disk" of each object).

First, the rebuild controller 925 sets the initial value of the processing count, based on the total number of reads and the total number of writes in a rebuild process (step 1101). The total number of reads represents the number of times information is read from a non-failed disk for restoring objects to be restored of a prescribed number of stripes, and the total number of writes represents the number of times information is written to a non-failed disk in order to restore the objects to be restored. The initial value of the processing count may be obtained, for example, by the following expressions.

$$\text{Average access count} = (\text{total number of reads} + \text{total number of writes})/\text{number of disks} \quad (1)$$

$$\text{Initial value} = \text{average access count} * \text{number of disks} - \text{total number of reads} \quad (2)$$

In the example of FIG. 10A and FIG. 10B, the prescribed number of stripes is 42, and reading is carried out twice and writing is carried out once for restoring one object to be restored. As a result, the total number of reads is 84 and the total number of writes is 42.

The numbers of disks on the right-hand side of expression (1) and the right-hand side of expression (2) represent the numbers of non-failed disks. If the value of the right-hand side of expression (1) is not an integer, the fractional portion of the value is dropped. Using expression (1) and expression (2) enables the number of writes with which the numbers of access evens to non-failed disks are evenly averaged to be set as the initial value of the processing count.

In the example of FIG. 10A and FIG. 10B, the number of disks is five. In this case, the initial value of the processing count is given by the following expressions.

$$\text{Average number of access events} = (84+42)/5 = 25 \quad (3)$$

$$\text{Initial value} = 25*5-84=41 \quad (4)$$

Next, the rebuild controller 925 determines the number of possible writes of each disk in the rebuild process (step 1102). The number of possible writes of a disk represents the number of times that, when objects to be restored of a prescribed number of stripes are restored, restored information may be written to the disk.

FIG. 12A and FIG. 12B depict a processing example of obtaining the number of possible writes of each disk of FIG. 10A and FIG. 10B. The object to be restored d (stripe #p) represents information d in script #p (d=0 to 5, p=0 to 41). For example, the object to be restored 0 (stripe #1) represents information 0 in stripe #1.

In the six stripes mentioned below of the 42 stripes of FIG. 10A and FIG. 10B, the objects to be restored correspond to information stored on Disk #0 that has failed first and are restored when Disk #0 has failed.

stripe #0
stripe #13
stripe #19
stripe #25
stripe #31
stripe #37

The objects to be restored in the other 36 stripes correspond to information that was stored on Disk #1 before Disk #0 failed.

In this example, a disk to which information originally stored on Disk #1 is preferentially determined. Therefore, the order of objects to be restored in FIG. 12A and FIG. 12B differs from the order of objects to be restored in FIG. 10A and FIG. 10B. A first object to be restored to a 36th object to be restored in FIG. 12A and FIG. 12B correspond to information originally stored on Disk #1, and a 37th object to be restored to a 42nd object to be restored correspond to information originally stored on Disk #0.

A read disk ID represents identification information (disk number) of a disk that stores information used for restoring the object to be restored of each stripe. A write disk ID represents identification information of a disk (writable disk) to which the object to be restored of each stripe may be written.

Shaded cells of Disk #2 to Disk #6 represent writable disks in each stripe. Of the non-failed disks, disks other than disks indicated by a read disk ID may be selected as writable disks.

For example, read disks corresponding to the object to be restored 0 (stripe #1) are Disk #2 and Disk #6, and writable disks are Disk #3 to Disk #5. Read disks corresponding to the object to be restored 3 (stripe #4) are Disk #5 and Disk #6, and writable disks are Disk #2 to Disk #4.

The rebuild controller 925 is able to obtain the number of possible writes of each disk by counting the number of shaded cells for each disk. The number of possible writes of Disk #2 to Disk #6 is as follows:

| | |
|---|---|
| Disk #2 | 28 |
| Disk #3 | 22 |
| Disk #4 | 28 |
| Disk #5 | 22 |
| Disk #6 | 26 |

The rebuild controller 925 may obtain the number of possible writes of each disk by subtracting the number of reads of each disk in a rebuild process from the total number of writes "42". The number of reads of a disk represents the number of times that, when objects to be restored of a prescribed number of stripes are restored, information is read from the disk. The number of reads of Disk #2 to Disk #6 is as follows:

| | |
|---|---|
| Disk #2 | 14 |
| Disk #3 | 20 |
| Disk #4 | 14 |
| Disk #5 | 20 |
| Disk #6 | 16 |

Next, the rebuild controller 925 determines the number of writes of each disk (step 1103). The number of writes of a disk represents the number of times that, when objects to be restored of a prescribed number of stripes are restored, information is written to the disk. The rebuild controller 925 is able to obtain the number of writes of each disk, for example, by subtracting the number of reads of each disk from the number of access events of each disk. As the number of access events of each disk, for example, the average number of access events may be used.

FIG. 13 depicts an example of the number of writes of each disk when an average number of access events "25" is used as the number of access events of each disk.

The number of writes obtained in such a way represents the number of writes that is desirable for equalizing access to a plurality of disks in a rebuild process. However, if a write destination disk for each object to be restored is selected out of writable disks, there is a possibility that more write operations than the number of writes are carried out in some disk and fewer write operations than the number of writes are carried out in another disk. Therefore, it is desirable to select a write destination disk of each object to be restored so that the number of writes of each disk is complied with.

Next, the rebuild controller 925 selects one disk as a write destination disk based on the number of possible writes and the number of writes of each disk (step 1104). At this point, the rebuild controller 925 determines the priority of each disk, based on the number of possible writes and the number of writes of each disk, and is able to select a disk with a relatively high priority as the write destination disk.

As the priority, for example, a rate of the number of writes in the number of possible writes may be used. As the rate of a disk increases, it is more difficult to assign the same number of objects to be restored as the number of writes to the disk. Therefore, it is desirable to assign objects to be restored to such a disk prior to assigning objects to be restored to other disks.

FIG. 14 depicts rates of the numbers of writes of FIG. 13 with respect to the number of possible writes in conjunction with FIG. 12A and FIG. 12B. In this case, among rates of Disk #2 to Disk #6, Disk #2 and Disk #4 have the highest rate. Therefore, either Disk #2 or Disk #4 is selected as a write destination disk. For example, when a disk with a smaller disk number is selected, Disk #2 is selected.

Next, the rebuild controller 925 selects one object to be restored and assigns the object to the selected disk (step 1105). At this point, the rebuild controller 925 may select an object to be restored with the highest ordinal rank among objects to be restored corresponding to shaded cells of the selected disk in FIG. 12A and FIG. 12B. For example, when Disk #2 is selected, as depicted in FIG. 15, the fourth object to be restored 3 (stripe #4) is assigned to Disk #2.

Next, the rebuild controller 925 decrements the processing count by one (step 1106) and compares the processing count with zero (step 1107). If the processing count is larger than zero (No in step 1107), the rebuild controller 925 repeats processing in and after step 1102. At this point, the rebuild controller 925 decrements the number of writes of the disk selected in step 1104 by one and decrements the number of possible writes of each writable disk corresponding to the object to be restored selected in step 1105 by one.

FIG. 16 depicts rates recalculated after the object to be restored 3 (stripe #4) is assigned to Disk #2. The number of writes of Disk #2 decreases by one, and the numbers of possible writes of Disk #2 to Disk #4 corresponding to the object to be restored 3 (stripe #4) each decrease by one. In this case, the rate of Disk #4 is highest. Therefore, Disk #4 is selected as a write destination disk, and the first object to be restored 0 (stripe #1) is assigned to Disk #4 as depicted in FIG. 17.

If the processing count is zero (Yes in step 1107), the rebuild controller 925 compares the initial value of the processing count with the number of objects to be restored (step 1108). If the initial value of the processing count is the same as the number of objects to be restored (Yes in step 1108), the rebuild processor 925 completes the process.

On the other hand, if the initial value of the processing count is smaller than the number of objects to be restored (No in step 1108), the rebuild controller 925 selects one object to be restored out of the remaining objects to be restored and assigns the selected object to any disk (step 1109). At this point, the rebuild controller 925 may select an object to be restored having the highest ordinal rank, out of the remaining objects to be restored, and assign the selected object to a disk having the smallest disk number.

Next, the rebuild controller 925 checks whether or not all the objects to be restored have been selected (step 1110). If an object to be restored that has not been selected is present (No in step 1110), the rebuild controller 925 repeats processing of step 1109. At this point, the rebuild controller 925 assigns an object to be restored to a disk to which a remaining object to be restored has not been assigned. Then, all the objects to be restored have been completely assigned (Yes in step 1110), the rebuild controller 925 completes the process.

FIG. 18 depicts write destination disks of 41 objects to be restored, from the first object to the 41st object, of FIG. 12A and FIG. 12B. These write destination disks of objects to be restored are determined in processing of step 1104 and step 1105.

At the time when a write destination disk of the 41st object to be restored 2 (stripe #31) is determined, the processing count is 0. However, the initial value "41" of the processing count is smaller than the number of objects to be restored "42". Therefore, the rebuild controller 925 performs processing of step 1109 so as to determine the write destination disk of the 42nd object to be restored 5 (stripe #37) to be Disk #2 as depicted in FIG. 19. As a result, the number of writes of Disk #2 is "12" and the number of access events is "26".

According to the write destination determination process of FIG. 11, when more disks than the number of HS areas included in each stripe fail, a write destination disk is selected using the number of reads of non-failed disks. Thus, access to disks is performed more efficiently.

At this point, using the total number of reads and the total number of writes of a plurality of disks and the number of reads of each disk, the number of writes of each disk is determined, and a write destination disk is selected using the number of writes of each disk. This equalizes access to a plurality of disks. Therefore, by making use of concurrent disk access, a high-speed rebuild process that provides a higher throughput than the throughput of one disk may be achieved.

Furthermore, according to the write destination determination process of FIG. 11, the number of possible writes of each disk is obtained using the total number of writes and the number of reads of each disk, and a write destination disk is selected using the number of writes and the number of possible writes of each disk. This makes it possible to identify a disk to which it is relatively difficult to assign the same number of objects to be restored as the number of writes, and to preferentially assign an object to be restored to the disk. Write destination disks of a plurality of objects to be restored may be determined efficiently.

Note that although, in the allocation pattern of FIG. 6A and FIG. 6B, one HS area is included in each stripe, a plurality of HS areas may be included in each stripe. Also in this case, when more disks than the number of HS areas included in each stripe fail, write destination disks of objects to be restored may be determined by the write destination determination process of FIG. 11.

Furthermore, although in the allocation pattern of FIG. 6A and FIG. 6B, information areas corresponding to two redundant sets of RAID 5 (2+1) are included in each stripe, information areas corresponding to three or more redundant sets may be included in each stripe. Each redundant set may have another data configuration of RAID 6 or the like.

Figure 20:
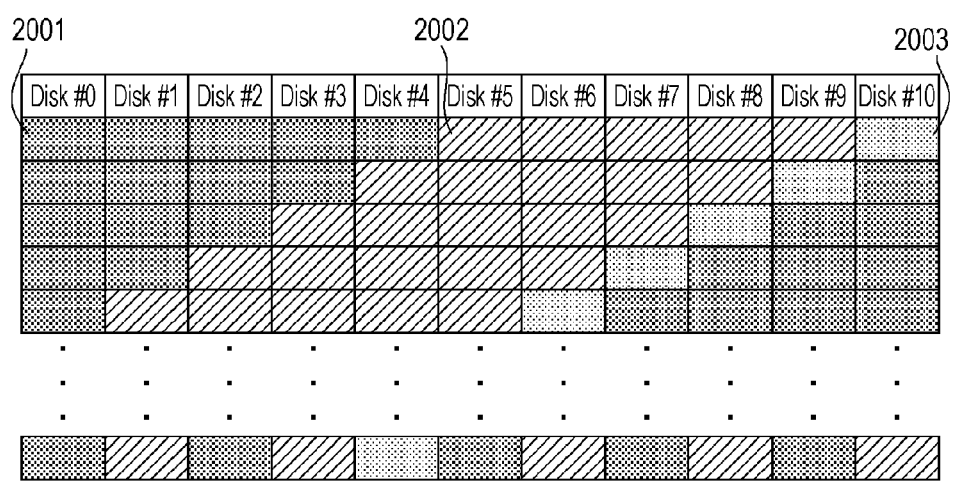
FIG. 20 is a diagram depicting an allocation pattern in which two redundant sets of RAID 6 (3+2) and one HS area are distributed.

FIG. 20 depicts an example of an allocation pattern in which information areas corresponding to two redundant sets of RAID 6 (3+2) and one HS area are distributed across 11 disks. Shading 2001 indicates information areas of redundant set #0, shading 2002 indicates information areas of redundant set #1, and shading 2003 indicates HS areas.

Each stripe includes five information areas of redundant set #0, five information areas of redundant set #1, and one HS area and represents a combination of information areas and HS areas. Also in this case, when more disks than the number of HS areas included in each stripe fail, write destination disks of objects to be restored may be determined by the write destination determination process of FIG. 11.

In the case where a rebuild process is not performed when more disks than the number of HS areas in the allocation pattern of FIG. 20 fail, a maximum of three failed disks are allowable. Therefore, the degree of redundancy of the storage device 902 is three. In contrast, in the case where a rebuild process is performed using free areas when more disks than the number of HS areas fail, a maximum of five failed disks are allowable. Therefore, the degree of redundancy of the storage device 902 is five. In this way, a rebuild process is performed using free areas of disks, thus improving data redundancy.

Next, with reference to FIG. 21A to FIG. 26B, a method of generating a conversion table based on the theory of Galois field or Galois extensions will be described. Here, it is assumed that m redundant sets and n HS areas are distributed across a set of k disks (disk pool) (m being an integer of 1 or more, n being an integer of 1 or more, and k being an integer of 4 or more). Each redundant set includes l information areas (l being an integer of 2 or more). In this case, k=l*m+n.

Initially, if k is prime, determining an allocation pattern based on a Galois field enables the prescribed number of stripes for distribution to be small. For example, if k=5, the set of remainders left when an integer is divided by 5, $\phi=\{0, 1, 2, 3, 4\}$, is the set (Galois field) in which the number of elements is finite and the four arithmetic operations are closed.

FIG. 21A depicts a table of mod (5) addition in the set ip, and FIG. 21B depicts a table of mod (5) multiplication in the set ip. In the table of mod (5) addition, the integer of each cell represents a result obtained by adding the integer of the corresponding row and the integer of the corresponding column, and, in the table of mod (5) multiplication, the integer of each cell represents a result obtained by multiplying the integer of the corresponding row by the integer of the corresponding column. For example, operations of 4+4 and 4×3 result in the following expressions:

$$4+4=8 \bmod 5=3 \in \phi \tag{5}$$

$$4\times3=12 \bmod 5=2 \in \phi \tag{6}$$

In FIG. 21A, rows of shift #0 to shift #4 correspond to stripes, and columns correspond to disks. In each column, integers of all the rows are different, and therefore integers in the same column between any two rows are not coincide with each other. Consequently, shift #0 to shift #4 represent five stripes that differ in the order in which areas are allocated.

In FIG. 21B, the integer of each cell corresponds to a shift ID (shift number) indicating any one of shift #0 to shift #4 of FIG. 21A. When integers, except for a column of "0" at the left edge, are compared with one another, integers in the same column are not coincide with between any two rows. Consequently, in any combination of two patterns among pattern #0 to pattern #4, two shift IDs of the same column, except the column of "0", indicate different shifts.

In such a manner, each row of pattern #0 to pattern #4 represents a combination of four shift IDs corresponding to four stripes, and each shift ID represents the allocation of areas in one stripe. In any combination of two patterns, the allocation of areas in a stripe corresponding to each column of one pattern differs from the allocation of areas in a stripe corresponding to the same column of the other pattern.

Combining the allocation of areas in a stripe represented by each shift of mod (5) addition table based on the table of mod (5) multiplication makes it possible to generate five exclusive patterns in which allocation of areas does not coincide with each other among stripes. Each pattern corresponds to four stripes, and therefore five patterns correspond to 20 stripes. Employing allocation of areas represented by these 20 stripes enables the load of each disk in a rebuild process to be equalized when any disk fails. Accordingly, the prescribed number of stripes is 20.

The prescribed number of stripes may be, for example, obtained by the following expressions.

$$\text{The prescribed number of stripes} = k*(k-1) \tag{7}$$
$$= (l*m+n)*(l*m+n-1)$$

FIG. 22 depicts an allocation pattern in which information areas of RAID 5 (3+1) and one HS area are distributed across Disk #0 to Disk #4 based on the tables of mod (5) addition and mod (5) multiplication. In this case, k=5, l=4, m=1, and n=1.

Note however that the allocation pattern of FIG. 22 is not the final allocation pattern but a temporary allocation pattern. Each of integers 0 to 4, 10 to 14, 20 to 24, and 30 to 34 of cells of FIG. 22 represents an information area or an HS area.

Each of pattern #0 to pattern #4 includes four stripes. In four stripes of pattern #0, which is a basic pattern, all the areas are allocated according to shift #0, while, in four stripes of each of pattern #1 to pattern #4, areas are allocated according to respective different shifts. For example, in stripe #4 of pattern #1, areas are allocated according to shift #1, and, in stripe #5, areas are allocated according to shift #2. In stripe #6, areas are allocated according to shift #3, and, in stripe #7, areas are allocated according to shift #4.

The same five integers included in five patterns represent five areas (each area being an information area or an HS area) included in the same stripe in the final allocation pattern. For example, pattern #0 to pattern #3 may apply to allocation of four information areas, and pattern #4 may apply to allocation of an HS area. According to this allocation pattern, 20 integers allocated in each disk are all different. It is therefore found that information areas and HS areas are equally distributed across disks. Accordingly, for example, in a rebuild process performed when Disk #0 fails, access to Disk #1 to Disk #4 may be performed equally. The same applies to cases where another disk fails.

The same four integers included in pattern #0 to pattern #3 of FIG. 22 are replaced with different integers representing respectively different information. The resulting allocation pattern is as depicted in FIG. 23. Integers included in pattern #4 of FIG. 22 are replaced with integers of FIG. 23, which are the same as integers allocated in Disk #0 of FIG. 23. The integers allocated in Disk #0 of FIG. 23 correspond to integers allocated in Disk #0 of FIG. 22 that are the same as the integers in pattern #4 of FIG. 22. However, for stripe #16 to stripe #19 of FIG. 23, cells of Disk #0 are vacant.

For example, information 0 to information 3 form one redundant set, and HS area 0 for this redundant set is allocated in stripe #16 of Disk #1. When Disk #0 fails, information 0 of stripe #0 is restored by using information 1 to information 3 and is written to HS area 0 of stripe #16.

This allocation pattern may be used without any change. However, in FIG. 23, four pieces of information forming one redundant set and the corresponding HS area are not included in the same stripe. This is inconvenient for a rebuild process performed in units of stripes. Therefore, integers in each column are reallocated in the vertical direction of the drawing so that the information areas and the corresponding HS area are included in the same stripe. As a result, an allocation pattern as depicted in FIG. 24 is generated. When the integers are reallocated in the vertical direction of the drawing, the situation in which areas are distributed across a plurality of disks does not change.

According to the final arrangement patter of FIG. 24, a conversion table in the case where information areas of RAID 5 (3+1) and one HS area are distributed across five disks may be generated.

If k is a prime number other than 5, for the set of remainders left when an integer is divided by k, $\phi=\{0, 1, 2, 3, \ldots, k-1\}$, it is also possible to create tables of addition and multiplication similar to those in the above. Then, an allocation pattern and a conversion table may be generated by combining allocation of areas in stripes represented by shifts of the addition table based on the multiplication table.

Next, a method for generating a conversion table if k is a power of a prime number will be described. In this case, an allocation pattern is determined based on a Galois extension, and thus it is possible to make small the prescribed number of stripes as in the case where k is prime. Here, as a Galois extension, the set $GF(q^r)$ in which a member (element) a is added (q being a prime number, and r being a natural number).

$$GF(q^r)=\{0,1,\alpha,\alpha^2,\ldots,\alpha^{q^r-2}\} \quad (8)$$

Based on $GF(q^r)$, tables of addition and multiplication are created, and, based on these tables, an allocation pattern in a disk pool having $q^r$ disks may be generated. If a primitive polynomial $f(\alpha)=0$ holds, each member of $GF(q^r)$ takes a value making rounds with a period r and, for addition and multiplication, has the same nature as a Galois field. For example, if $q=r=2$, $f(\alpha)=\alpha^2+\alpha+1$, the set $GF(2^2)=\{0, 1, \alpha, \alpha^2(=\alpha+1)\}$ is used. Since $f(\alpha)=0$ holds, $\alpha^2=\alpha+1$.

FIG. 25A depicts a table of addition in $GF(2^2)$, and FIG. 25B depicts a table of multiplication in $GF(2^2)$. In the addition and multiplication tables, 00, 01, 10, and 11 represent 0, 1, α, and α+1, respectively. By replacing 00, 01, 10, and 11 with integers 0, 1, 2, and 3, respectively, the tables of FIG. 25A and FIG. 25B are rewritten as depicted in FIG. 26A and FIG. 26B.

Then, arrangements of areas in stripes represented by shifts in the addition table depicted in FIG. 26A are combined based on the multiplication table depicted in FIG. 26B. This makes it possible to generate four exclusive patterns in which allocation of areas does not coincide with each other among stripes. Furthermore, integers in each column are rearranged in the vertical direction of the drawing so that the information areas and HS area corresponding to each other are included in the same stripe. Thus, an allocation pattern in a disk pool having 4 ($=2^2$) disks and a conversion table may be generated.

When q is a prime number other than 2 and r is a natural number other than 2, it is possible to generate addition and multiplication tables by using an appropriate primitive polynomial. Then, allocation of areas in stripes represented by shifts in the addition table are combined based on the multiplication table. This makes it possible to generate an allocation pattern and a conversion table. The prescribed number of stripes is determined by expression (7) using $k=q^r$.

The configurations of the storage control device 701 of FIG. 7 and the storage system of FIG. 9 are merely examples, and partial elements thereof may be omitted or changed in accordance with the applications and conditions of the storage system. For example, in the storage system of FIG. 9, if the storage control device 911 controls access to the DE 913, the storage control device 912 may be omitted. In addition, in place of disk 941-1 to 941-k, other storage devices such as an optical disk device, a magneto-optical disk device, and a semiconductor storage device may be used.

The flowcharts of FIG. 8 and FIG. 11 are merely examples, and part of the processes may be omitted or changed in accordance with the configuration and conditions of the storage system. For example, when, instead of the number of writes with which the numbers of access events to non-failed disks are evenly averaged, another value is set as the initial value of the processing count, processing of step 1101 of FIG. 11 may be omitted.

In addition, when a write destination disk is selected based on the number of writes of each disk without determining the number of possible writes of each disk, the processing of step 1102 may be omitted. When a write destination disk is selected directly based on the number of reads of each disk without determining the number of possible writes and the number of writes of each disk, the processing of step 1102 and step 1103 may be omitted. The order of step 1102 and step 1103 may be exchanged with each other.

The allocation patterns depicted in FIG. 2, FIG. 4, FIG. 6A, FIG. 6B, FIG. 10A, FIG. 10B, and FIG. 20 are merely examples and other allocation patterns may be used in accordance with the configuration and conditions of the storage system. For example, a plurality of HS areas may be included in each stripe, information areas corresponding to three or more redundant sets may be included in each stripe, and six or more information areas may be included in each redundant set.

The order of objects to be restored depicted in FIG. 12A and FIG. 12B is merely an example, and 42 objects to be restored may be processed in a different order.

Figure 27:
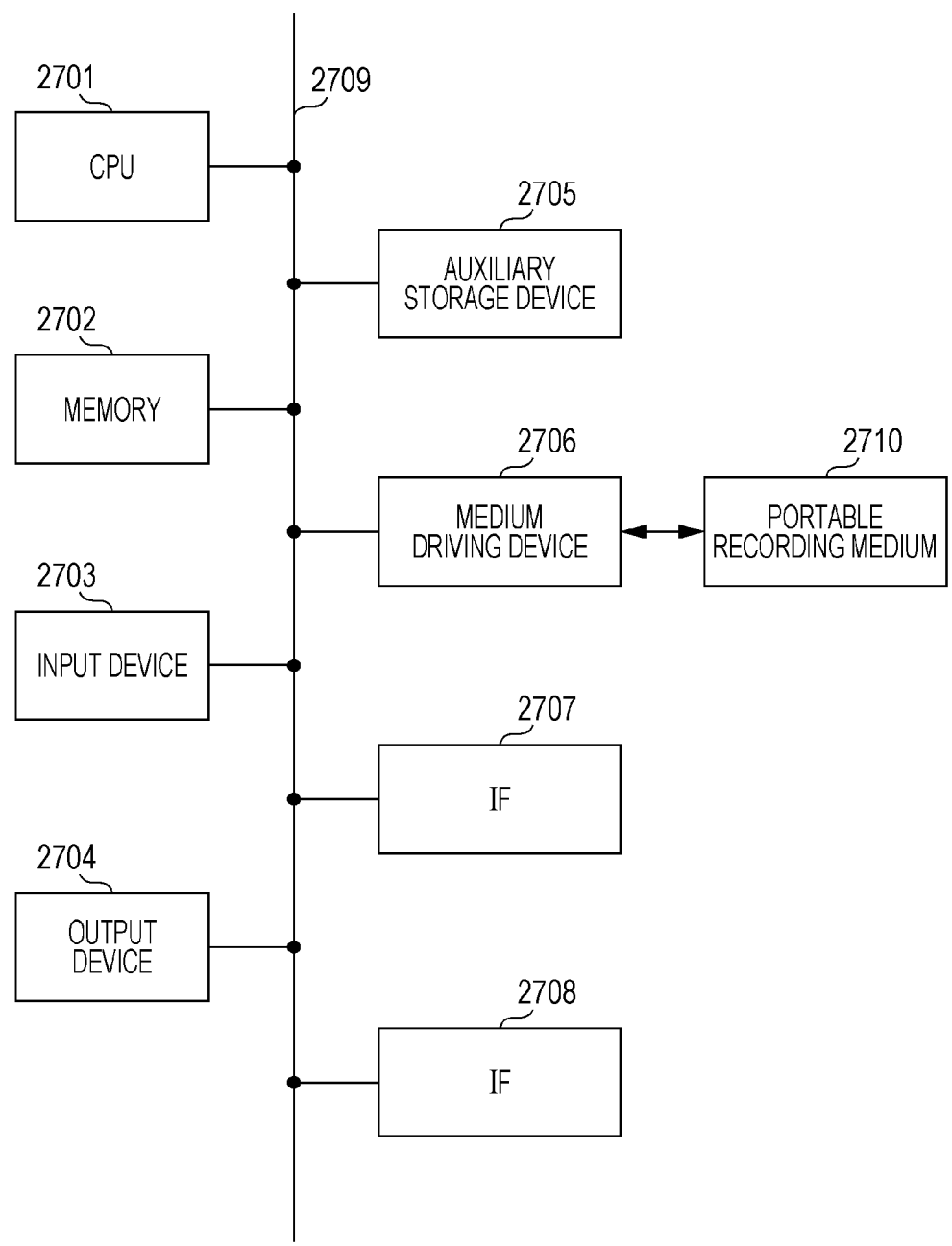
FIG. 27 is a configuration diagram of an information processing device.

The storage control device 701 of FIG. 7 and the storage control device 911 and the storage control device 912 of FIG. 9 may be implemented by using an information processing device (computer) as illustrated in FIG. 27.

An information processing device of FIG. 27 includes a central processing unit (CPU) 2701, a memory 2702, an input device 2703, an output device 2704, an auxiliary storage device 2705, a medium driving device 2706, an IF 2707, and an IF 2708. These elements are mutually coupled via a bus 2709.

The memory 2702 is, for example, a semiconductor memory such as a read only memory (ROM), a random access memory (RAM), or a flash memory and stores a storage control program and data. The memory 2702 may be used as the storage unit 927 or the storage unit 937 of FIG. 9.

When the information processing device of FIG. 27 is the storage control device 911, the CPU 2701, for example, executes the storage control program by using the memory 2702, thereby operating as the restoration unit 924, the rebuild controller 925, and the command issue controller 926. When the information processing device of FIG. 27 is the storage control device 912, the CPU 2701, for example, executes the storage control program with the use of the memory 2702, thereby operating as the restoration unit 934, the rebuild controller 935, and the command issue controller 936.

The input device 2703 is, for example, a keyboard, a bonding device, or the like and is used for input of instructions and information from a user or an operator. The output device 2704 is, for example, a display device, a printer, a speaker, or the like and is used for output of inquiries and processing results to a user or an operator.

The auxiliary storage device 2705 is, for example, a magnetic disk device, an optical disk device, a magneto-optical disk device, a tape device, or the like. The auxiliary storage device 2705 may be a hard disk drive or a flash memory. The information processing device may store the storage control program and data in the auxiliary storage device 2705 and use them by loading them into the memory 2702. The auxiliary storage device 2705 may be used as the storage unit 927 or the storage unit 937 of FIG. 9.

The medium driving device 2706 drives the portable recording medium 2710 and accesses the recorded content. The portable recording medium 2710 is a memory device, a flexible disk, an optical disk, a magneto-optical disk, or the like. The portable recording medium 2710 may be a compact disk read only memory (CD-ROM), a digital versatile disk (DVD), a universal serial bus (USB) memory, or the like. A user or an operator may store the storage control program and data in the portable recording medium 2710 and use them by loading them into the memory 2702.

In such a manner, computer-readable recording media for storing the storage control program and data include physical (non-transitory) recording media such as the memory 2702, the auxiliary storage device 2705, and the portable recording medium 2710.

The IF 2707 is coupled to communications networks such as a local area network (LAN) and the Internet and is a communications interface that performs data conversion in communications. The IF 2707 may be used as the IF 921 or the IF 931 of FIG. 9.

The IF 2708 is a communications interface for communications with the DE 913. The IF 2708 may be used as the IF 923 or the IF 933 of FIG. 9.

Note that the information processing device does not have to include all the elements of FIG. 27, and some of the elements may be omitted in accordance with applications and conditions. For example, when an instruction or information from a user or an operator is input via the IF 2707, the input device 2703 may be omitted. When an inquiry or a processing result to a user or an operator is output via the IF 2707, the output device 2704 may be omitted. Furthermore, when the portable recording medium 2710 is not used, the medium driving device 2706 may be omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control apparatus comprising:
a memory; and
a processor coupled to the memory, the processor configured to:
determine whether more storage devices, among a plurality of storage devices across which a plurality of information areas storing information representing redundant data and one or more spare areas are distributed, than the number of the spare areas fail, and
perform a rebuild process of information stored in a plurality of information areas of a failed first storage device included in the plurality of combinations of the plurality of information areas and the one or more spare areas, when determining that the more storage devices than the spare areas fail,
the rebuild process including:
restoring information corresponding to one information area of the failed first storage device included in one combination among the plurality of combinations, and
determining a write destination storage device to which the restored information is to be written in accordance with the number of times information is read from a non-failed second storage device.

2. The storage control apparatus according to claim 1, wherein
the processor is further configured to:
determine the number of times the restored information is written into the second storage device based on the number of times information is read from a specific plurality of non-failed storage devices including the second storage device, the number of times the restored information is written into the specific plurality of non-failed storage devices, and the number of times information is read from the second storage device, and
determine whether to use the second storage device as a write-destination storage device based on the determined number of times the restored information is written into the second storage device.

3. The storage control apparatus according to claim 2, wherein
the processor is further configured to:
  determine the number of times the restored information is writable into the second storage device based on the number of times the restored information is written into the specific plurality of non-failed storage devices and the number of timed information is read from the second storage device, and
  determine whether to use the second storage device as a write-destination storage device based on the number of times the restored information is written into the second storage device and the number of times the restored information is writable into the second storage device.

4. The storage control apparatus according to claim 3, wherein
the processor is further configured to determine whether to use the second storage device as a write-destination storage device based on a ratio of the number of times the restored information is written into the second storage device to the number of times the restored information is writable into the second storage device.

5. A storage control method comprising:
determining, by a computer, whether more storage devices, among a plurality of storage devices across which a plurality of information areas storing information representing redundant information and one or more spare areas are distributed, than a number of the spare areas fail,
performing, by the computer, a rebuild process of information stored in a plurality of information areas of a failed first storage device included in the plurality of combinations of the plurality of information areas and the one or more spare areas, when determining that the more storage devices than the spare areas fail,
restoring, by the computer, information corresponding to one information area of the failed first storage device included in one combination among the plurality of combinations of the plurality of information areas and the one or more spare areas in the rebuild process, and
determining, by the computer, a write destination storage device to which restored information is to be written based on the number of times information is read from a non-failed second storage device.

6. The storage control method according to claim 5, wherein the determining a write-destination storage device includes:
  determining the number of times the restored information is written into the second storage device based on the number of times information is read from a specific plurality of non-failed storage devices including the second storage device, the number of times the restored information is written into the specific plurality of non-failed storage devices, and the number of times information is read from the second storage device, and
  determining whether to use the second storage device as a write-destination storage device based on the determined number of times the restored information is written into the second storage device.

7. The storage control method according to claim 6, wherein the determining a write-destination storage device includes:
  determining the number of times the restored information is writable into the second storage device based on the number of times the restored information is written into the specific plurality of non-failed storage devices and the number of timed information is read from the second storage device, and
  determining whether to use the second storage device as a write-destination storage device based on the number of times the restored information is written into the second storage device and the number of times the restored information is writable into the second storage device.

8. The storage control method according to claim 7, wherein the determining a write-destination storage device includes:
  determining whether to use the second storage device as a write-destination storage device based on a ratio of the number of times the restored information is written into the second storage device to the number of times the restored information is writable into the second storage device.

* * * * *